(12) United States Patent
Yuksel et al.

(10) Patent No.: US 9,406,213 B2
(45) Date of Patent: Aug. 2, 2016

(54) NOTIFICATION ENGINE

(71) Applicant: Google Inc., Mountain View, CA (US)

(72) Inventors: Baris Yuksel, New York, NY (US); Craig Nevill-Manning, New York, NY (US); Samantha Merritt, Sammamish, WA (US)

(73) Assignee: Google Inc., Mountain View, CA (US)

( * ) Notice: Subject to any disclaimer, the term of this patent is extended or adjusted under 35 U.S.C. 154(b) by 40 days.

(21) Appl. No.: 14/176,283

(22) Filed: Feb. 10, 2014

(65) Prior Publication Data

US 2015/0187201 A1   Jul. 2, 2015

Related U.S. Application Data

(60) Provisional application No. 61/921,227, filed on Dec. 27, 2013.

(51) Int. Cl.
*G08B 21/00* (2006.01)
*G08B 21/24* (2006.01)
*G06Q 30/06* (2012.01)

(52) U.S. Cl.
CPC ............ *G08B 21/24* (2013.01); *G06Q 30/0631* (2013.01)

(58) Field of Classification Search
CPC . G08B 21/24; A61J 7/0481; A61J 2007/0436
USPC ............ 340/539.13, 995, 995.24; 705/14.57, 705/14.58, 14.64; 455/456.3, 456.2
See application file for complete search history.

(56) References Cited

U.S. PATENT DOCUMENTS

| 6,687,608 | B2 * | 2/2004 | Sugimoto et al. ............. 701/468 |
| 7,016,855 | B2 | 3/2006 | Eaton |
| 7,525,425 | B2 * | 4/2009 | Diem ....................... 340/539.13 |
| 7,583,972 | B2 | 9/2009 | Clipsham |
| 7,788,589 | B2 | 8/2010 | Frankel |
| 7,966,020 | B2 * | 6/2011 | Drennan .................... 455/456.1 |
| 7,999,669 | B2 | 8/2011 | Singh |
| 8,069,422 | B2 | 11/2011 | Sheshagiri |
| 8,375,320 | B2 | 2/2013 | Kotler |
| 8,381,088 | B2 | 2/2013 | Kikin-Gil |
| 8,385,944 | B1 | 2/2013 | Nelissen |
| 2006/0149621 | A1 * | 7/2006 | Do et al. ......................... 705/14 |

(Continued)

FOREIGN PATENT DOCUMENTS

| EP | 2056244 A1 | 5/2009 |
| EP | 2224386 A1 | 9/2010 |

OTHER PUBLICATIONS

Cowan, Mathew, U.S. Appl. No. 13/928,950, filed Jun. 27, 2013, for "Determining Activities Relevant to Users," 48 pages.

(Continued)

*Primary Examiner* — Jeffery Hofsass
(74) *Attorney, Agent, or Firm* — Fish & Richardson P.C.

(57) ABSTRACT

Methods, systems, and apparatus, including computer programs encoded on computer storage media, for providing recommendations to users. One of the methods includes receiving data indicating a selection, by a user, of a notification option relating to a first entity, adding the first entity to an interest list for the user, determining, based at least on adding the first entity to the interest list for the user, to provide a notification relating to an entity, and providing, based on determining to provide the notification relating to the entity, the notification.

28 Claims, 7 Drawing Sheets

(56) References Cited

U.S. PATENT DOCUMENTS

| | | |
|---|---|---|
| 2008/0248815 A1 | 10/2008 | Busch |
| 2009/0313109 A1 | 12/2009 | Bous et al. |
| 2010/0306016 A1 | 12/2010 | Solaro |
| 2011/0238474 A1* | 9/2011 | Carr et al. ............ 705/14.23 |
| 2011/0264528 A1* | 10/2011 | Whale ............ 705/14.58 |
| 2012/0149394 A1 | 6/2012 | Singh |
| 2012/0159341 A1 | 6/2012 | Murillo |
| 2012/0242482 A1 | 9/2012 | Elumalai |
| 2012/0310527 A1 | 12/2012 | Yariv et al. |
| 2015/0045068 A1* | 2/2015 | Soffer et al. ............ 455/456.3 |

OTHER PUBLICATIONS

Pedregal, Christopher et al., U.S. Appl. No. 13/842,544, filed Mar. 13, 2013, for "Obtaining Information to Provide to Users," 49 pages.
International Search Report and Written Opinion in International Application No. PCT/US2014/40838, mailed Jan. 22, 2015, 9 pages.

* cited by examiner

NOTIFICATION ENGINE

CROSS-REFERENCE TO RELATED APPLICATION

This application claims the benefit of U.S. Provisional Application Ser. No. 61/921,227, filed on Dec. 27, 2013, which is incorporated by reference.

BACKGROUND

Reminder software can receive input from a user specifying a particular event and provide a reminder to the user when the particular event occurs. For example, a user may enter an event in a calendar and view events in the calendar. Some examples of events include birthdays, anniversaries, holidays, and meetings.

SUMMARY

In general, one innovative aspect of the subject matter described in this specification can be embodied in methods that include the actions of receiving data indicating a selection, by a user, of a notification option relating to a first entity, adding the first entity to an interest list for the user, determining, based at least on adding the first entity to the interest list for the user, to provide a notification relating to an entity, and providing, based on determining to provide the notification relating to the entity, the notification. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Providing the notification may comprise providing the notification to a user device operated by the user. The user device may comprise a mobile device. Determining to provide the notification relating to the entity may comprise determining whether the entity is open. Providing the notification may be based on determining that the entity is open. Determining whether the entity is open may comprise determining that a particular activity is currently available at the entity. Providing the notification may comprise providing the notification for the particular activity at the entity based on determining that the particular activity is currently available at the entity. The entity may have a physical location. The method may comprise determining whether the user device is within a predetermined distance from the physical location of the entity, wherein providing the notification is based on determining that the user device is within the predetermined distance from the physical location of the entity.

In some implementations, the first entity and the entity are the same entity. The entity may be different than the first entity. The method may comprise identifying the entity using a topic assigned to both the first entity and the entity. Providing the notification may comprise providing the notification about the entity and information identifying the first entity.

The subject matter described in this specification can be implemented in particular embodiments so as to realize one or more of the following advantages. In some implementations, a system may provide a user with a notification about an entity or activity only when the entity or activity is available, e.g., currently open and/or showing. In some implementations, a system may provide a user with a notification about an entity with which they have expressed an interest. In some implementations, a system may determine entity notifications using requested entity notifications.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A user may search for an entity, e.g., a restaurant, museum, or show, and request a notification about the entity. A notification server receives data indicating the request and determines a location of the user, e.g., based on a user device operated by the user, and provides a notification to the user when the user device is at a physical location near the physical location of the entity and the entity is open.

The notification server may also identify another entity using data about the entity and provide a notification for the other entity, e.g., when the user device is at a physical location near the physical location of the other entity and the other entity is open. The notification about the other entity may include information about the first entity. For example, the notification may include "You requested a notification about Puccini & Pinetti. Based on this request, you may be interested in Maria's Italian Kitchen which is nearby."

The notification, for the entity or the other entity, may be specific to a particular event available at the particular entity. For example, the notification server may receive data requesting a notification for a particular art exhibit at a museum or an art show and may provide the notification to a user device, operated by the user, when the particular art exhibit is located at the museum or when the particular art show is available. For example, the notification server may determine that an art show for which a user requested a notification is no longer in Philadelphia, the user's home town, but is open in New York, that the user has traveled to New York, and provide a notification about the art show to the user.

Figure 1A:
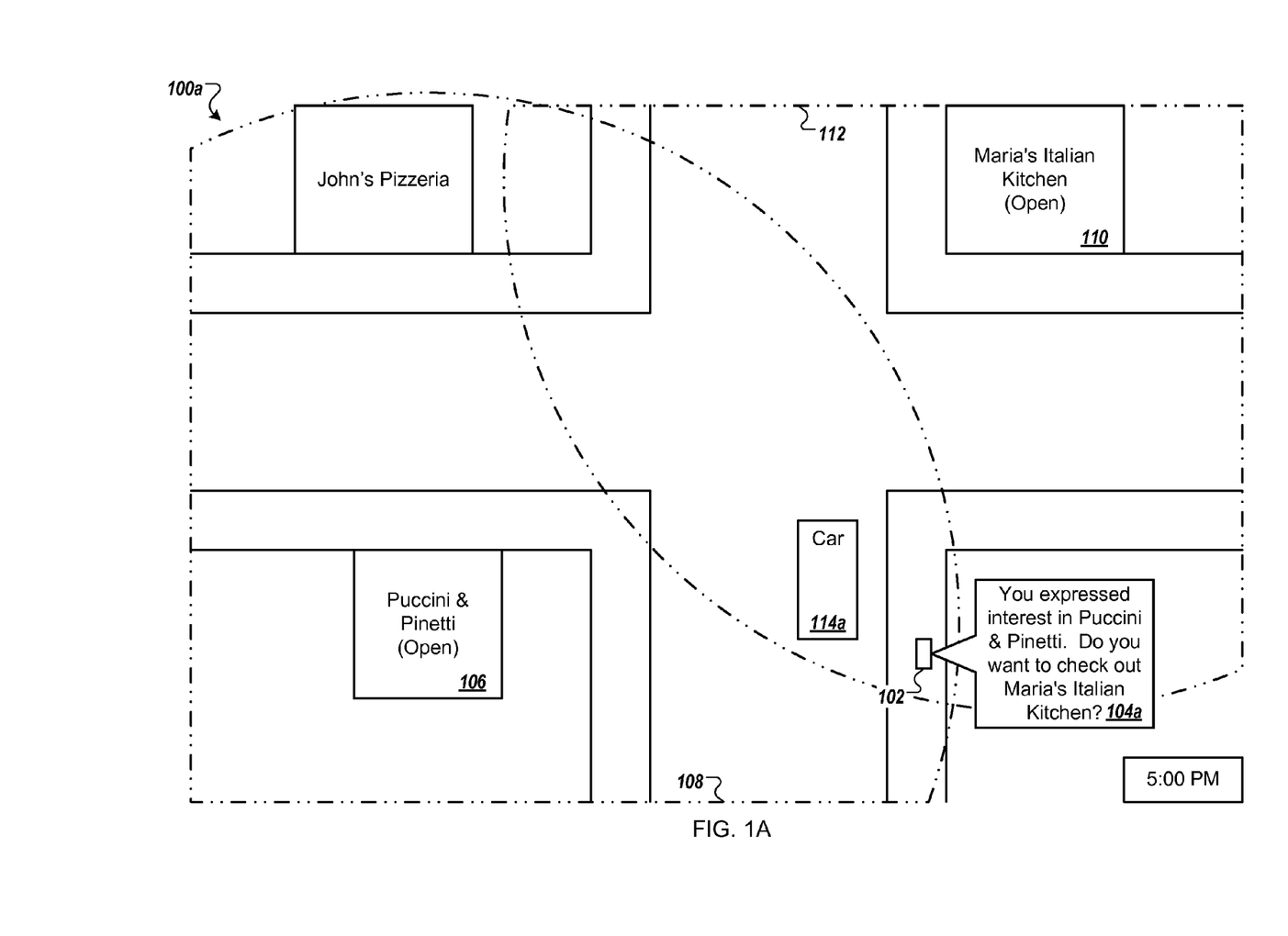
FIGS. 1A-B show examples of an environment which provides a user device with a notification for an entity.
Figure 1B:
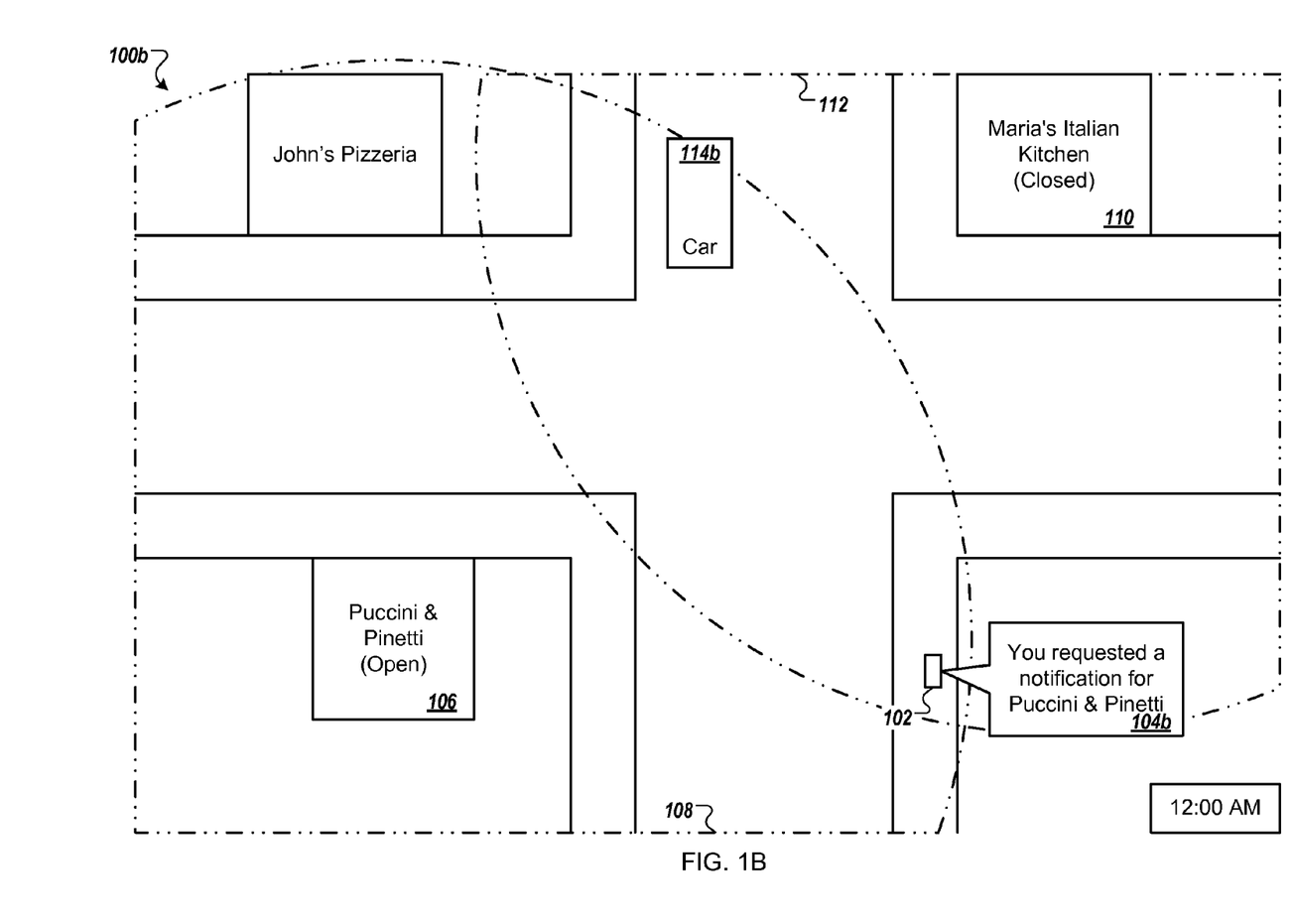

FIGS. 1A-B show examples of an environment 100 which provides a user device 102 with a notification for an entity. For example, a notification server receives data identifying a first entity, e.g., Puccini & Pinetti 106, and a user that would like to receive a notification about the first entity, as described in more detail below. The notification server determines that the user device 102, operated by the user, is within a predetermined distance from an entity and provides the user device 102 with a notification relating to the entity.

For example, the notification server may determine that the user may be interested in Maria's Italian Kitchen 110, based on the user's request to receive a notification about the Italian restaurant Puccini & Pinetti 106, that the user device 102 is within a first predetermined distance 112 from Maria's Italian Kitchen 110, and that Maria's Italian Kitchen 110 is open, e.g., based on a current time of 5:00 pm and operating hours of 10 am-10 pm Sunday through Saturday for Maria's Italian Kitchen, as shown in the environment 100a in FIG. 1A. The notification server provides the notification about Maria's Italian Kitchen 110 to the user device 102 and the user device 102 presents a notification 104a on a display, e.g., "You expressed interest in Puccini & Pinetti. Do you want to check out Maria's Italian Kitchen?", or provides an audible notification to the user, e.g., based on a user setting for the notification.

The notification server may provide the notification to the user device 102 in response to a request received from the user device 102. For example, the notification server may receive a request for restaurants physically located near the user device 102, identify Puccini & Pinetti 106 and Maria's Italian Kitchen 110, potentially in addition to other restaurants, and provide data identifying Puccini & Pinetti 106 and Maria's Italian Kitchen 110 to the user device 102, including data for the notification 104a.

In some examples, the notification server may receive a request for entities physically located near the user device 102 when the request does not specify a particular topic associated with the request, e.g., when the user operating the user device 102 has free time and is unsure of what activities in the area may be of interest to the user. The notification server determines entities that may be of interest to the user and are physically located near the user device 102, e.g., based on a predetermined threshold distance and entities in which the user has expressed an interest, and provides a notification to the user device identifying one or more of the determined entities. For example, the notification server may identify Maria's Italian Kitchen 110, the "Walker Art Center," and a coffee shop and provide one or more notifications to the user about the identified entities, e.g., one notification for each entity.

The notifications may be ranked such that the notification with the highest rank is presented first, the notification with the second highest rank is presented second, and so on. When the user device 102 receives input indicating that the user is interested in the entity identified in the highest ranking notification and does not want to view additional notifications, the user device 102 does not present the other notifications. When the user device 102 receives input indicating that the user wants to view additional notifications, the user device 102 presents the additional notifications until all notifications have been presented or until receiving input from the user that no further notifications should be presented.

The notification server may identify a particular activity at an entity that may be of interest to the user. For example, the notification server may determine that an exhibit by Jim Hodges is available at the Walker Art Center and provide a notification to the user device 102 identifying the exhibit: "You went to an exhibit by Jim Hodges a few years ago. Do you want to check out his current exhibit at the Walker Art Center?"

When the user subscribes to notifications, e.g., and does not explicitly request a notification, the notification server may determine the location of the user device 102 and provide notifications to the user device 102 based on the physical location of the user device 102. The notification server may determine the movement speed of the user device 102 and provide a notification based on the movement speed. For example, the notification server may provide the user device 102 a notification when the user device 102 is moving at a slow speed, e.g., indicating that the user may be walking or running, and not provide a notification to the user device 102 when the user device 102 is moving faster, e.g., when the user device 102 may be located in a car 114a or a plane, or the user operating the user device 102 may be biking.

When the notification server determines that Maria's Italian Kitchen 110 is closed, e.g., when it is 12:00 AM as shown in the environment 100b of FIG. 1B, the notification server does not provide the user device 102 with a notification about Maria's Italian Kitchen 110. For example, the notification server may receive a request from the user device 102 for a restaurant that is open, determine that Maria's Italian Kitchen 110 is closed and that Puccini & Pinetti 106 is open, that the user device 102 is within a second predetermined distance 108 from Puccini & Pinetti 106, and provide the user device 102 with a notification about Puccini & Pinetti 106. The user device 102 then presents a notification 104b, e.g., "You requested a notification for Puccini & Pinetti," to the user operating the user device 102. The user device 102 may present the notification 104b on a display or audibly.

The notifications 104a-b may include additional information about the entity identified in the notification. For example, the notification 104a may include a link to the entity's website, when the entity is open, the address of the entity, and a link to a map application that will show the user how to get to the entity.

Figure 2A:
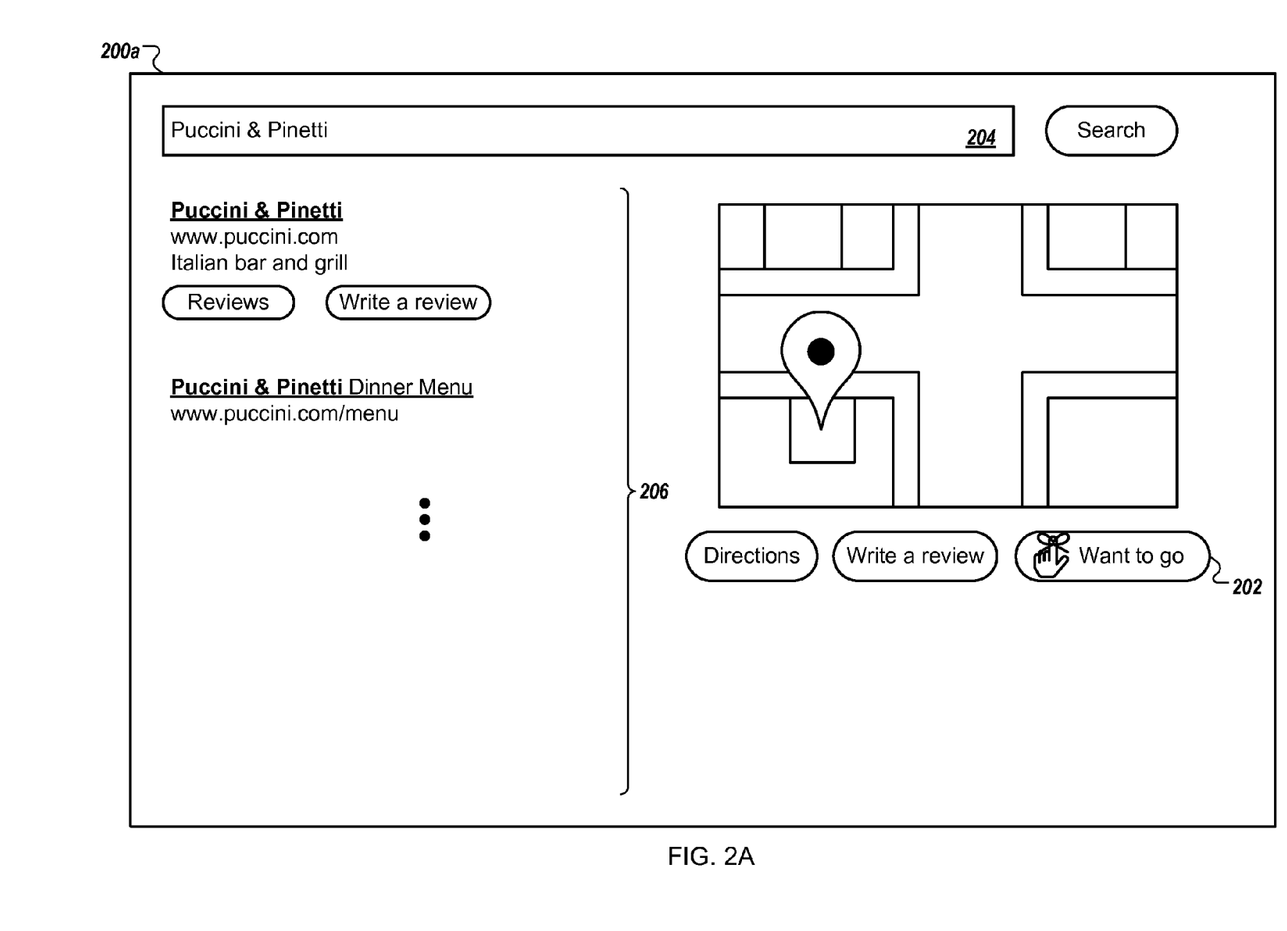
FIGS. 2A-B show an example of a web page with a notification option and a reminder set option.
Figure 2B:
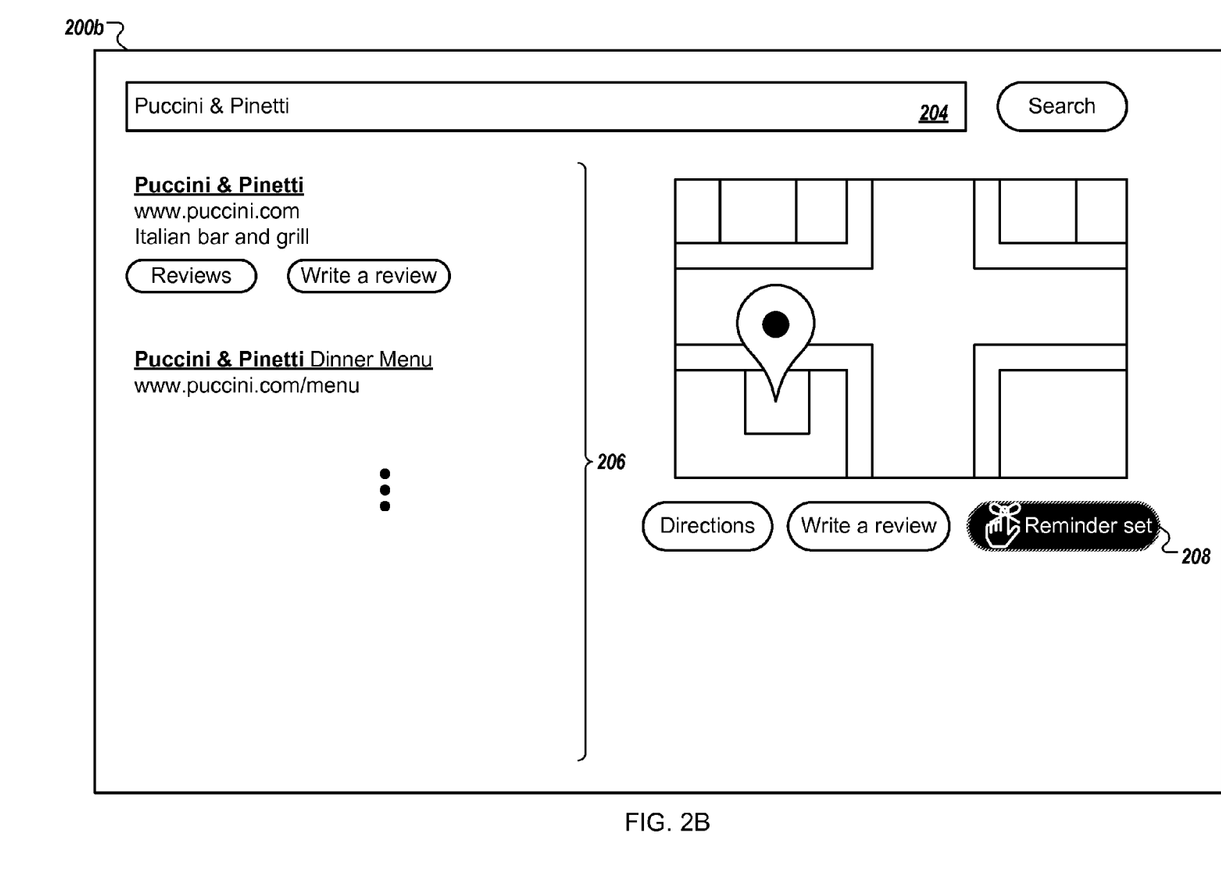

FIGS. 2A-B show an example of a web page 200 with a notification option 202 and a reminder set option. For example, the web page 200a, shown in FIG. 2A, may be presented on a user device and include a query input field 204 that receives input identifying a query entered by a user of the user device. For example, the user device may receive the query "Puccini & Pinetti" from the user.

In response to receiving the query from the user, the user device requests query results responsive to the query from a server, receives data representing the query results from the server, and presents one or more query results 206 in the web page 200a using the data received from the server.

The user device presents menu options in the web page 200a, including a "Directions" option, a "Write a review" option," and a "Want to go" notification option 202, shown in FIG. 2A. When the user device receives a user selection of the notification option 202, the user device presents a "Reminder set" option 208 in the web page 200b, shown in FIG. 2B, providing a visual indication to the user that the user requested a notification about the restaurant Puccini & Pinetti.

Upon selection of the notification option 202, the user device provides a recommendation server with data about the query and the user operating the user device and the recommendation server adds the query to a notification list for the user. The notification server may later provide a notification relating to the query to a user device operated by the same user.

If the user device, or another user device operated by the same user and associated with the user, e.g., with a username and password, receives a query for "Puccini & Pinetti" at a later time, the user device may present the reminder set option 208 with query results responsive to the query, e.g., and will not present the notification option 202.

Figure 3:
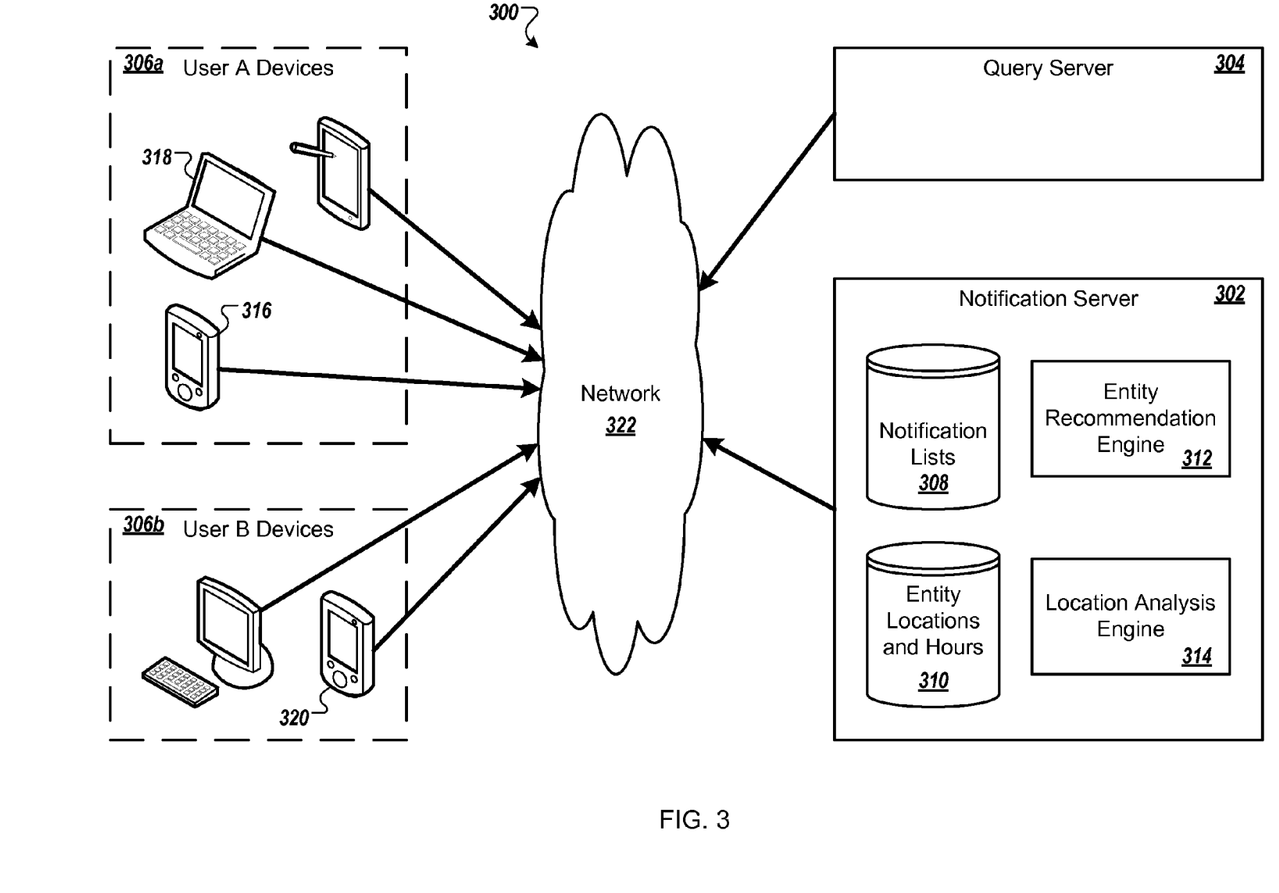
FIG. 3 shows an example of an environment that includes a notification server that provides a notification to a user device operated by a user.

FIG. 3 shows an example of an environment 300 that includes a notification server 302 that provides a notification to a user device operated by a user. For example, a query server 304 receives a query from a user A device 306a operated by a user A and the user A device 306a provides the notification server 302 with data indicating a selection by the user A of a notification option. The notification server 302 stores data in a notification list 308 for the user A indicating the user A's interest in the entity that corresponds with the query.

The notification server 302 includes data representing entity locations and hours of operation 310. For example, the entity locations 310 are represented by latitude and longitude coordinates or an address. The hours of operation 310 may include both an opening and a closing time. The opening and closing times may be specific to a particular day of the week, e.g., where the hours of operation 310 include different times for each day of the week. The hours of operation 310 may include holidays indicating particular days when a corresponding entity is closed when that entity would be open otherwise.

An entity recommendation engine 312, included in the notification server 302, may analyze the notification lists 308 for each user, e.g., the user A and a user B, and determine entity recommendations using the entities with which the respective user has expressed an interest. For example, the entity recommendation engine 312 may use a notification request for Puccini & Pinetti to determine that the user A may like Maria's Italian Kitchen. The entity recommendation engine 312 may update the notification list 308 for the user A with the determined recommendations, e.g., by adding Maria's Italian Kitchen to the notification list 308 for the user A.

A location analysis engine 314 receives physical location data from a user device operated by the user A, e.g., a mobile phone 316, and compares the received physical location data with location data for the entities on the notification list 308 for the user A. If the location analysis engine 314 determines that the user device is within a predetermined distance from one of the entities and that the entity is open, or a particular activity at one of the entities, with which the user may be interested, is available, then the location analysis engine 314, or the notification server 302, provide the user device with a notification regarding the determined entity or activity. The notification may indicate that the user A requested a notification for the entity, that the entity is open, the specific location of the entity, and/or that the user A may be interested in the entity based on other entities with which the user requested notifications.

The query server 304 may receive a query from a laptop 318 and the notification server 302 may provide the notification to the mobile phone 316. For example, a the user A may have an account with the notification server 302, e.g., identified by a username and password, and use the same account on both the mobile phone 316 and the laptop 318. The notification server 302 may determine that the user A is carrying the mobile phone 316, e.g., based on movement of the mobile phone 316, and provide a notification to the mobile phone 316 based on the determination. The notification server 302 may provide the notification to the user A's account, e.g., such that the user A may view the notification on any of the user A devices 306a, or only to the mobile phone 316, e.g., as a text message.

The notification server 302 may provide the most appropriate recommendations to the user A devices 306a or the user B devices 306b based on the time of day, the location of a device currently operated by the corresponding user, and/or a particular type of activity in which the user is interested, e.g., when the query server 304 or the notification server 302 receive a request for a particular type of entity or activity.

For instance, a mobile phone B 320 may receive a query from the user B requesting restaurant recommendations. The query server 304 receives data representing the query from the mobile phone B 320, requests a list of entities from the notification server 302, determines query results responsive to the query, and provides a response including the list of entities and the query results to the mobile phone B 320. The response may include a notification highlighting one or more of the entities on the list of entities and indicating that the user B requested a notification about the particular entity or may be interested in the particular entity based on a notification request for another entity.

In some examples, when the notification server 302 provides recommendations to a user device using the time of day, the recommendation is based on the particular type of entity or activity. For example, when a user is in the vicinity of a restaurant and a bar, both of which are open twenty-four hours a day, upon receipt of a restaurant request, the notification server 302 may provide a recommendation for the restaurant during the morning or early afternoon and may provide a different recommendation for the bar during the late afternoon and evening. For instance, when the notification server 302 receives a recommendation request on a weekend morning from the mobile phone 316, the notification server 302 provides a recommendation to the mobile phone 316 for the restaurant, e.g., which has a highly rate brunch menu.

The user devices 306a-b may include personal computers, mobile communication devices, and other devices that can send and receive data over a network 322. The network 322, such as a local area network (LAN), wide area network (WAN), the Internet, or a combination thereof, connects the user devices 306a-b, the query server 304, and the notification server 302.

In some implementations, the notification server 302 or the entity recommendation engine 312 may identify a particular entity for a notification list 308 using other types of data in addition to notification requests received from the user. For example, the user A may provide the notification server 302 with data representing types of activities, e.g., attending sporting events or hiking, or entities, e.g., French restaurants or historic museums, and the notification server 302 may use this data when identifying entities in which the user A may be interested.

Figure 4:
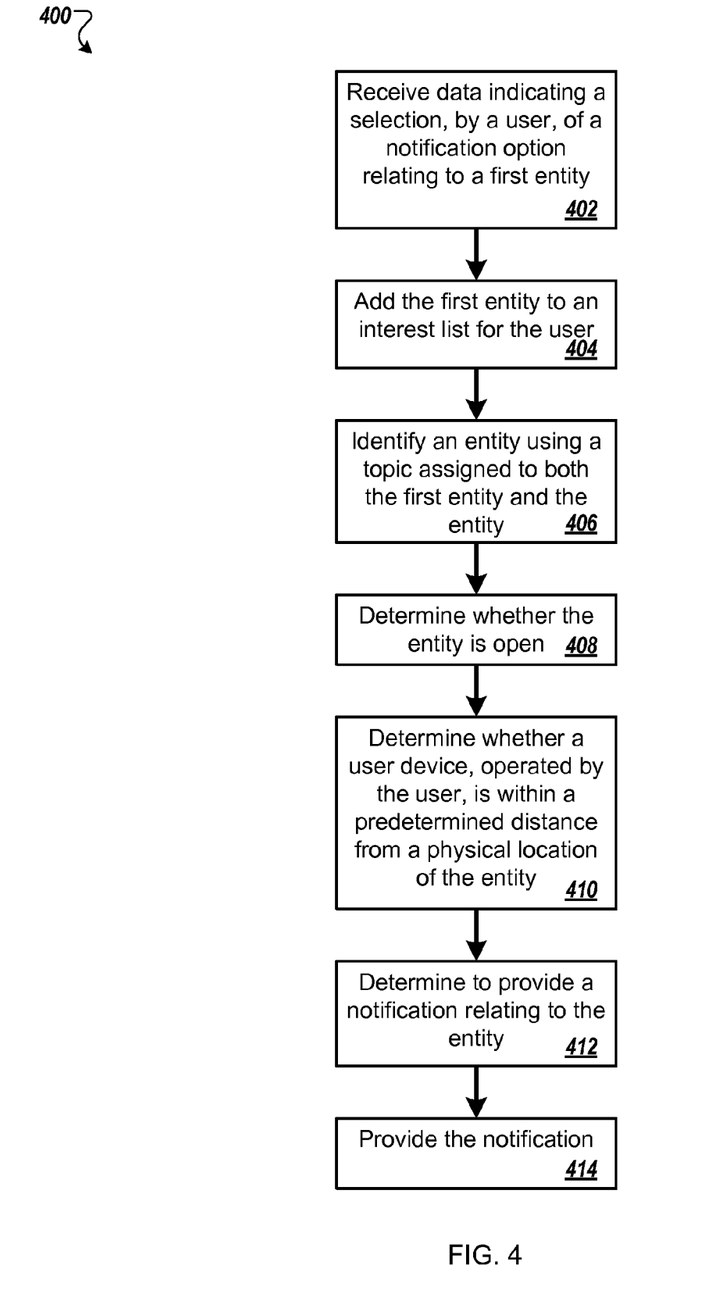
FIG. 4 is a flow diagram of a process for providing a notification.

FIG. 4 is a flow diagram of a process 400 for providing a notification. For example, the process 400 can be used by the notification server 302 from the environment 300.

The notification server receives data indicating a selection, by a user, of a notification option relating to a first entity (402).

The notification server adds the first entity to an interest list for the user (404). The interest list may include entities for which the user has requested notifications. In some implementations, the interest list may include a list of topics in which the user is interested, e.g., Italian and French restaurants, soccer, and water skiing.

The notification server identifies an entity using a topic assigned to both the first entity and the entity (406). The entity may be the same as the first entity or may be different. In some instances, when the topic is "Italian Restaurants," the first entity may be Puccini & Pinetti and the entity may be Maria's Italian Kitchen. The notification server may use multiple entities from the user's interest list to identify the entity, e.g., where each of the multiple entities has at least one common topic with the identified entity and the common topics may be the same or different topics.

The notification server determines whether the entity is open (408). The notification server may determine whether a particular activity, e.g., a show or exhibit, is currently available at the entity.

The notification server determines whether a user device, operated by the user, is within a predetermined distance from a physical location of the entity (410). For example, the notification server may receive data representing the latitude and longitude of the user device and determine the physical location, e.g., latitude and longitude, of the user device using the received data.

The notification server determines to provide a notification relating to the entity (412). The determination may be based on adding the first entity to the interest list for the user, determining that the entity is open, determining that the particular activity is available, and/or determining that the user device is within the predetermined distance from the physical location of the entity.

The notification server provides the notification (414), based on determining to provide the notification. The notification server may provide the notification to the user device and/or an account of the user.

The notification may include data identifying why the notification server is providing the notification to the user. For instance, the notification may include "You requested a notification for Puccini & Pinetti. Puccini & Pinetti is two blocks away and is open until 2 am." In another example, the notification may include "You requested notifications for Puccini & Pinetti, and John's Pizzeria. Do you want to check out Maria's Italian Kitchen (which is open until 10 pm and is a block away)?"

The order of steps in the process 400 described above is illustrative only, and providing the notification can be performed in different orders. For example, the notification server may determine whether the user device is within a predetermined distance from the physical location of the entity prior to determining whether the entity is open and/or the particular activity is currently available at the entity.

In some implementations, the process 400 can include additional steps, fewer steps, or some of the steps can be divided into multiple steps. For example, the notification server may perform steps 402, 406, 412, and 414 without performing steps 404, 408, and 410. In some instances, the notification server determines to provide the notification based on determining that the entity is open, or the particular activity is available at the entity, without determining that the user device is within the predetermined distance from the physical location of the entity.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 5:
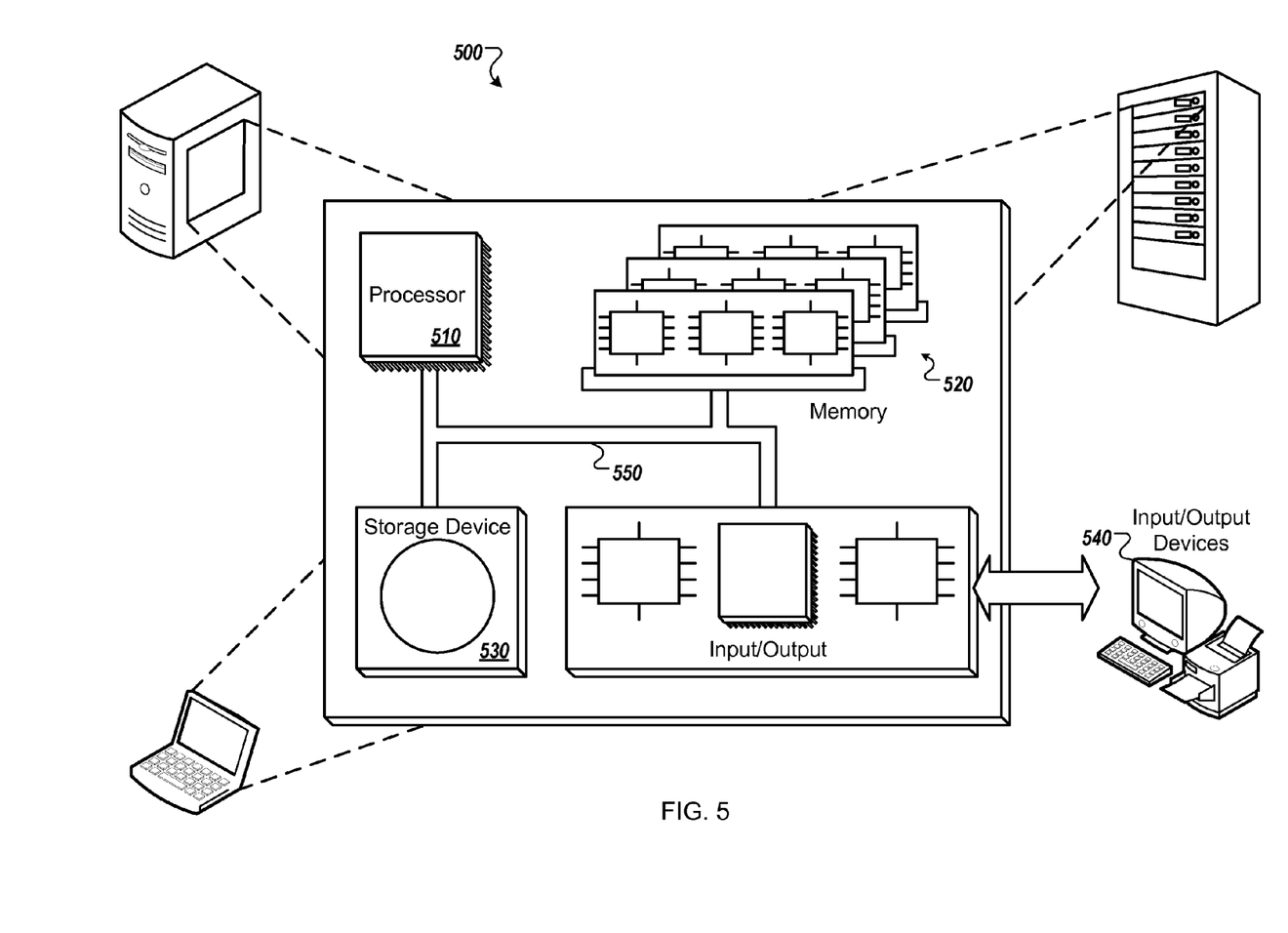
FIG. 5 is a block diagram of a computing system that can be used in connection with computer-implemented methods described in this document.

An example of one such type of computer is shown in FIG. 5, which shows a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In situations in which the systems discussed here collect personal information about users, or may make use of personal information, the users may be provided with an opportunity to control whether programs or features collect user information (e.g., a user's preferences, or a user's current location), or to control whether and/or how to receive content from the notification server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the query server of the notification server.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   identifying an entity;
   receiving data indicating a selection from a search results page, by a user, of an option to add the entity to an interest list for which notifications are to be provided;
   identifying a topic associated with the entity based on the selection of the option to add the entity to the interest list for which notifications are to be provided;
   adding the entity and the topic associated with the entity to the interest list for the user based on the selection of the option to add the entity to the interest list for which notifications are to be provided;
   determining that the user likely has an interest in another entity associated with the topic based on the addition of the topic associated with the entity to the interest list for which notifications are to be provided for the user;
   determining that a physical location associated with the other entity that is associated with the topic is located within a threshold distance of a user device associated with the user based on physical location data generated from the user device; and
   in response to determining that the physical location associated with another entity that is associated with the topic is located within the threshold distance of the user device associated with the user, providing a notification, using the user device, regarding the other entity that is associated with the topic.

2. The method of claim 1, wherein providing the notification comprises providing the notification to the user device operated by the user.

3. The method of claim 2, wherein the user device comprises a mobile device.

4. The method of claim 2, further comprising:
   determining whether the other entity is open; and
   wherein providing the notification is based on determining that the other entity is open.

5. The method of claim 4, wherein:
   determining whether the other entity is open comprises determining that a particular activity is currently available at the other entity; and
   providing the notification comprises providing the notification for the particular activity at the other entity based on determining that the particular activity is currently available at the other entity.

6. The method of claim 4, wherein the entity has a physical location, the method further comprising:
   determining whether the user device is within a predetermined distance from the physical location of the entity, wherein providing the notification is based on determining that the user device is within the predetermined distance from the physical location of the entity.

7. The method of claim 1, wherein the entity and the other entity are the same entity.

8. The method of claim 1, wherein the entity is different than the other entity.

9. The method of claim 8, wherein providing the notification comprises providing the notification about the other entity and information identifying the entity.

10. A system comprising:
    one or more computers and one or more storage devices storing instructions that are operable, when executed by the one or more computers, to cause the one or more computers to perform operations comprising:
      identifying an entity;
      receiving data indicating a selection from a search results page, by a user, of an option to add the entity to an interest list for which notifications are to be provided;
      identifying a topic associated with the entity based on the selection of the option to add the entity to the interest list for which notifications are to be provided;
      adding the entity and the topic associated with the entity to the interest list for the user based on the selection of the option to add the entity to the interest list for which notifications are to be provided;
      determining that the user likely has an interest in another entity associated with the topic based on the addition of the topic associated with the entity to the interest list for which notifications are to be provided for the user;
      determining that a physical location associated with the other entity that is associated with the topic is located within a threshold distance of a user device associated with the user based on physical location data generated from the user device; and
      in response to determining that the physical location associated with another entity that is associated with the topic is located within the threshold distance of the user device associated with the user, providing a notification, using the user device, regarding the other entity that is associated with the topic.

11. The system of claim 10, wherein:
    providing the notification comprises providing the notification to the user device.

12. The system of claim 11, wherein the user device comprises a mobile device.

13. The system of claim 11, further comprising:
    determining whether the other entity is open; and
    wherein providing the notification is based on determining that the other entity is open.

14. The system of claim 13, wherein:
    determining whether the other entity is open comprises determining that a particular activity is currently available at the other entity; and
    providing the notification comprises providing the notification for the particular activity at the other entity based on determining that the particular activity is currently available at the other entity.

15. The system of claim 13, wherein the entity has a physical location, the operations further comprising:
    determining whether the user device is within a predetermined distance from the physical location of the entity, wherein providing the notification is based on determining that the user device is within the predetermined distance from the physical location of the entity.

16. The system of claim 10, wherein the entity and the other entity are the same entity.

17. The system of claim 10, wherein the entity is different than the other entity.

18. The system of claim 17, wherein providing the notification comprises providing the notification about the other entity and information identifying the entity.

19. A non-transitory computer-readable medium storing software comprising instructions executable by one or more computers which, upon such execution, cause the one or more computers to perform operations comprising:
    identifying an entity;
    receiving data indicating a selection from a search results page, by a user, of an option to add the entity to an interest list for which notifications are to be provided;

identifying a topic associated with the entity based on the selection of the option to add the entity to the interest list for which notifications are to be provided;

adding the entity and the topic associated with the entity to the interest list for the user based on the selection of the option to add the entity to the interest list for which notifications are to be provided;

determining that the user likely has an interest in another entity associated with the topic based on the addition of the topic associated with the entity to the interest list for which notifications are to be provided for the user;

determining that a physical location associated with the other entity that is associated with the topic is located within a threshold distance of a user device associated with the user based on physical location data generated from the user device; and in response to determining that the physical location associated with another entity that is associated with the topic is located within the threshold distance of the user device associated with the user, providing a notification, using the user device, regarding the other entity that is associated with the topic.

20. The computer-readable medium of claim 19, wherein providing the notification comprises providing the notification to the user device operated by the user.

21. The computer-readable medium of claim 20, wherein the user device comprises a mobile device.

22. The computer-readable medium of claim 20, wherein:
determining whether the other entity is open; and
wherein providing the notification is based on determining that the other entity is open.

23. The computer-readable medium of claim 22, wherein:
determining whether the other entity is open comprises determining that a particular activity is currently available at the other entity; and
providing the notification comprises providing the notification for the particular activity at the other entity based on determining that the particular activity is currently available at the other entity.

24. The computer-readable medium of claim 22, wherein the entity has a physical location, the operations further comprising:
determining whether the user device is within a predetermined distance from the physical location of the entity, wherein providing the notification is based on determining that the user device is within the predetermined distance from the physical location of the entity.

25. The computer-readable medium of claim 19, wherein the entity and the other entity are the same entity.

26. The computer-readable medium of claim 19, wherein the entity is different than the other entity.

27. The computer-readable medium of claim 26, wherein providing the notification comprises providing the notification about the entity and information identifying the other entity.

28. The method of claim 1, wherein the notification provided regarding the other entity that is associated with the topic comprises an audio, visual, or haptic notification.

* * * * *